US005077872A

United States Patent [19]

Guthammar

[11] Patent Number: 5,077,872

[45] Date of Patent: Jan. 7, 1992

[54] ANTITHEFT DEVICE

[75] Inventor: Jan Guthammar, Snertinge, Denmark

[73] Assignee: Antonson Security Denmark A/S, Karlslunde, Denmark

[21] Appl. No.: 566,609

[22] Filed: Aug. 10, 1990

[51] Int. Cl.[5] ........................ F16B 21/00; A44B 9/00; G08B 13/14

[52] U.S. Cl. ................................ 24/704.1; 24/706.8; 70/57.1; 267/161; 267/148

[58] Field of Search ................ 70/57.1, 276; 24/704.1, 24/706.8, 635, 634; 267/158, 161, 159, 148, 149, 164, 160, 166.1

[56] References Cited

U.S. PATENT DOCUMENTS

| | | | |
|---|---|---|---|
| 2,690,529 | 9/1954 | Lindblad | 267/161 |
| 3,317,166 | 5/1967 | Hans-Joachim Janssen | 267/158 |
| 3,545,286 | 12/1970 | Stenstrom | 267/160 |
| 3,648,999 | 3/1972 | Bauer | 267/160 |
| 3,858,280 | 1/1975 | Martens | 70/276 |
| 4,012,813 | 3/1977 | Martens et al. | 70/57.1 |
| 4,221,025 | 9/1980 | Martens et al. | 70/276 |
| 4,339,853 | 7/1982 | Lipschitz | 70/57.1 |
| 4,400,861 | 8/1983 | Parker | 267/161 |
| 4,483,049 | 11/1984 | Gustavsson et al. | 70/57.1 |
| 4,523,356 | 6/1985 | Charlot, Jr. | 24/706.8 |
| 4,531,264 | 7/1985 | Minasy | 70/57.1 |
| 4,590,461 | 5/1986 | Cooper | 70/57.1 |
| 4,623,991 | 11/1986 | Vitringa | 267/161 |
| 4,651,136 | 3/1987 | Anderson et al. | 340/572 |
| 4,670,950 | 6/1987 | Wisecup et al. | 70/57.1 |
| 4,903,383 | 2/1990 | Gartshore | 340/572 |
| 4,944,075 | 7/1990 | Hogan | 70/57.1 |

FOREIGN PATENT DOCUMENTS

| | | | |
|---|---|---|---|
| 3722893 | 6/1988 | Fed. Rep. of Germany | 267/148 |
| 2616836 | 12/1988 | France | 70/276 |
| 89-11601 | 11/1989 | Japan | 267/161 |

*Primary Examiner*—Gary L. Smith
*Assistant Examiner*—Darwell Boucher
*Attorney, Agent, or Firm*—Ladas & Parry

[57] ABSTRACT

An antitheft device for marking articles for sale and comprising two members, which automatically interlock one another when one member is inserted in a cavity in the other member, the first member being a rod-shaped body with a completely or partially pointed insertion end, whereby said rod-shaped body is capable of engaging for instance balls loosely arranged in the cavity of the second member, a third member of magnetizable material being inserted below the loosely arranged balls, whereby a resilient member with an upward driving force is placed below said third member. According to the invention the resilient member is an annular plastic member with inward connecting parts connected to a centrally arranged disk-shaped plastic member pressing against the third member in the cavity, the annular plastic member being secured by way of squeezing to an annular groove in the bottom of the housing. As a result, the assembling of the members of the lock is facilitated and the bottom and the spring can be formed in one piece. An additional cavity may be provided around the cavity of the lock, said additional cavity containing a colored liquid.

2 Claims, 6 Drawing Sheets

ANTITHEFT DEVICE

FIELD OF THE INVENTION

The invention relates to antitheft devices for marking articles for sale and, more particularly, devices with two members that automatically interlock with each other.

BACKGROUND ART

U.S. Pat. No. 3,858,280 discloses a locking device where a cavity of one member contains balls for retaining a rod-shaped body. The cavity contains, furthermore, a spring retaining member that presses the balls against a side wall of the cavity. The spring is supported by a retaining ring at the bottom of the cavity. The retaining ring is, however, relatively difficult to mount in a groove in the side wall of the cavity.

SUMMARY OF THE INVENTION

The object of the present invention is to provide antitheft device with a lock comprising only a few members and suited for mass production.

The antitheft device according to the invention has a resilient member in form of an annular plastic member with inward connecting parts connected to a centrally arranged disk-shaped plastic member for pressing against the third member in a cavity, the annular plastic member being secured to the bottom of a lock by squeezing (press fitting). As a result, assembling the lock is facilitated and the resilient member can be formed in one place.

An additional cavity may be provided around the cavity containing the lock, the additional cavity containing a fluid, such as a liquid, and preferably, a colored, article-marking liquid. The bottom of the additional cavity is weakened in such a manner that it breaks if a tool, such as a wire-cutter, is inserted between the first and second members in order to cut a rod-shaped body for the lock. As a result, the liquid from the cavity is spread over the article for sale.

The first member may also be provided with a closed cavity containing a fluid, such as a liquid, and preferably, the colored liquid. The closed cavity comprises a bottom which is weakened in such a manner that it breaks if a tool is inserted between the first and second members.

The closed cavities may furthermore include a detectable, electromagnetic circuit, such as a resonant circuit. A detector circuit may be placed below the counter in a store in such a manner that the sales clerk can check whether the antitheft device has been removed before the customer leaves the store.

BRIEF DESCRIPTION OF THE DRAWINGS

The invention is described in greater detail below with reference to the accompanying drawings, in which.

DESCRIPTION OF THE PREFERRED EMBODIMENTS

Figure 1:
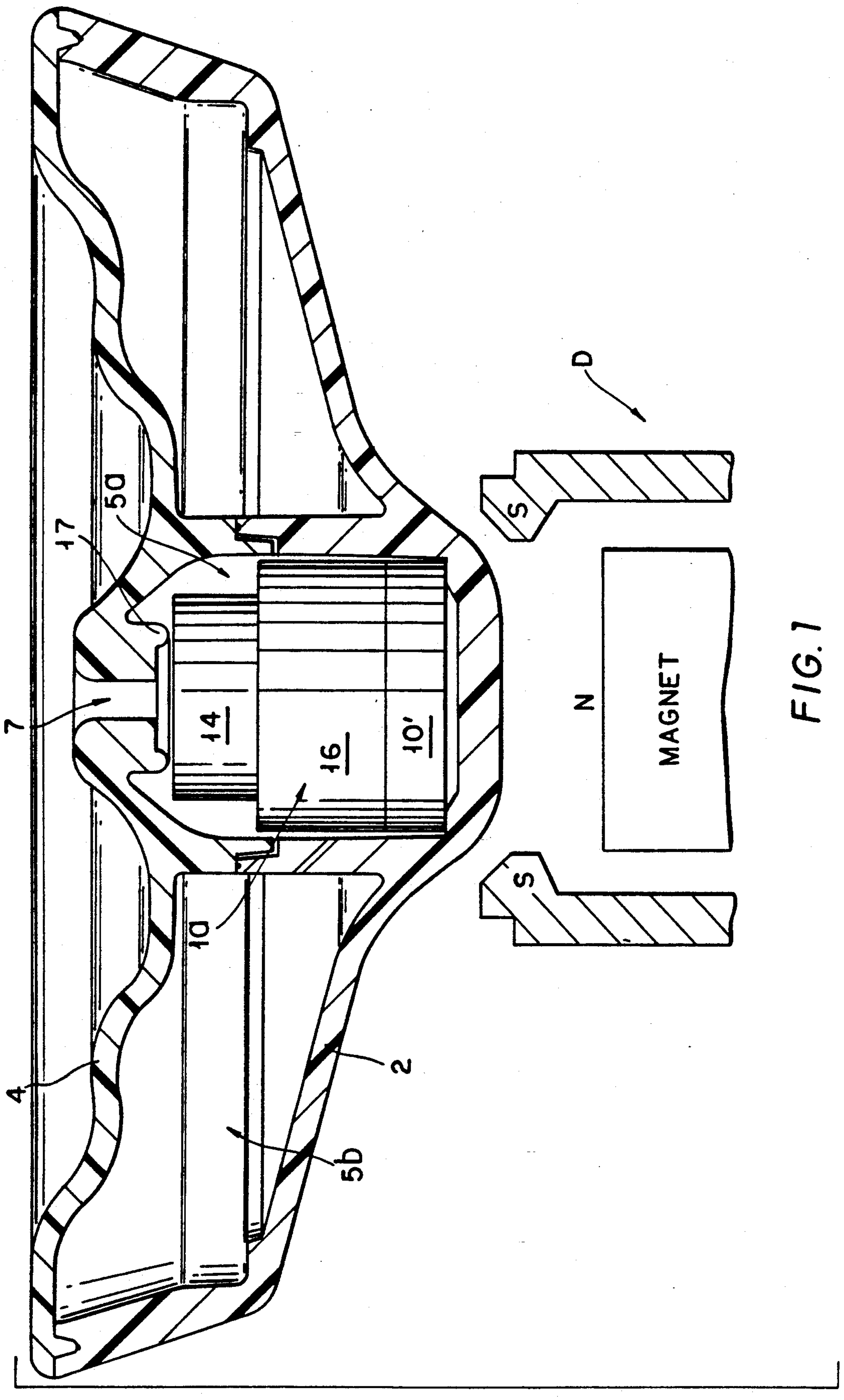
FIG. 1 is an elevation, partly in section, of a second member of an antitheft device with a lock according to the invention, and a portion of magnetic key therefor.

One portion of an antitheft device for marking an article (not shown) for sale is shown in FIG. 1 It has a first member 2 and a second member 4. The members are, for instance, made of plastic and secured to one another, for instance, by glue (not shown). A central cavity 5*a* and a circumferential cavity 5*b* are defined between the members 2 and 4. The central cavity 5*a* contains one component 1*a* of a lock. An opening 7 in the second member 4 of the device receives insertion of a body of the second component 1*b* (FIG. 2) of the lock. The second component 1*b* of the lock has a head 1*c* and a rod-shaped body 1*d* for the insertion and penetration of the article to form a pin-like means for fastening the article between the components. The circumferential cavity 5*b* contains a coil and a capacitor (neither shown) that are adjusted to a desired resonant frequency for detection when passing a detection zone with an electromagnetic field.

Figure 2:
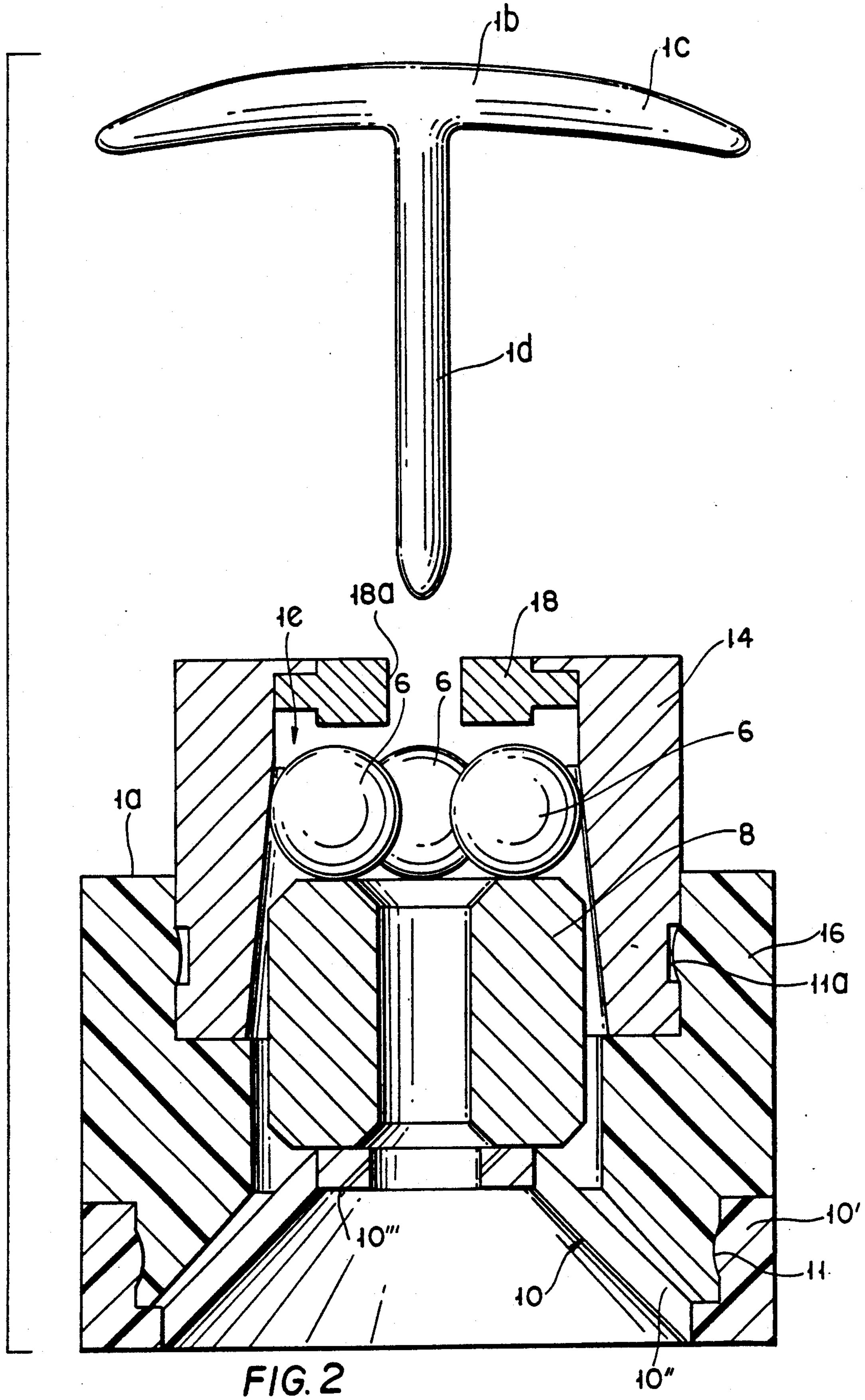
FIG. 2 is an elevation, partly in section and partly schematic, of a rod-shaped body and a lock of FIG. 1.

FIG. 2 shows both components 1*a*, 1*b* of the lock. The components automatically interlock when the rod-shaped body 1*d* having an at least partially pointed end is inserted into a third cavity 1*e* of the other component 1*a*. The rod-shaped body 1*d* then passes through an opening 18*a* in an annular disk 18 of the magnetizable material at an open end of the third cavity and between balls in the third cavity, both the disk and balls being loosely arranged in the third cavity 1*e*, which is slightly conical. Another annular member 8 is also loosely arranged in the third cavity on the opposite side of the balls 6 from the disk 18. A resilient member 10, which provides an upward driving force is also in the third cavity on the opposite side of the member 8 from the balls 6. The balls 6 and other annular member 8 are also made of magnetizable material.

The resilient member 10, which is shown schematically in FIG. 2, is made of plastic. It has an annular outermost member 10′ with inward, helical connecting members 10″ connected to a central, disk-shaped annular member 10‴ to press the other annular member 8 toward the balls 6 and disk 18 in the cavity. The outermost annular member 10′ is secured with a bead in a circumferential outermost groove 11 in the opposite bottom of the lock component 1*a* by squeezing (press fitting). To hold all these elements, component 1*a* has two housing members also interconnected by squeezing. The upper housing member 14 at the disk 18 defines a conical portion of the third cavity 1*e* that diverges downwards toward the resilient member 10 and is made of brass, whereas the lower housing member 16 is made of plastic.

Figure 4:
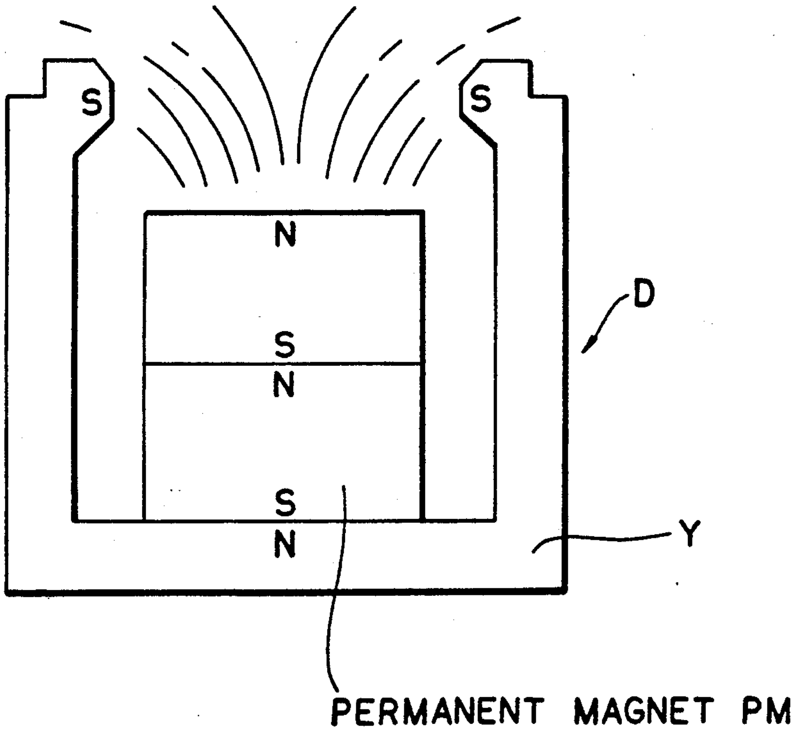
FIG. 4 is an elevation of the magnetic key of FIG. 1.

The rod-shaped body 1*d* is released from the lock component 1*a* by subjecting the lock component 1*a* to a very strong magnetic force that attracts the disk 18 balls 6 and member 8 of magnetizable material downwards towards the resilient member 10. Although the magnetic force should pull the balls 6 alone downwards, the balls 6 tend to remain in position in the conical cavity. The disk 18 solves this problem by being loosely retained above the balls 6 by an inward rim of the brass housing member 14 and, thus, free to also press the balls 6 downwards by means of the magnetic force into a radially larger, more diverged, lower portion of the cavity 1e. As a result, the rod-shaped body 1d can be easily retracted. For this, the magnetic field is concentrated towards the upper disk 18. A device D for such a magnetic field is illustrated in FIGS. 1 and 4. It comprises a strong cylindrical permanent magnet PM inserted in an upwardly open, cylindrical, cup-shaped yoke Y of soft iron.

The cone angle of the cavity 1e is approximately 6°. In addition to the release effect just described, this also provides a locking effect of on the rod-shaped body 1d such that the more the latter is retracted upwards, out of the cavity 1e, the more the balls are pressed against the rod-shaped body 1d by the convergence of the cavity 13 in that direction. This locking effect cannot be achieved without the conical portion of cavity 1e.

The member 8 below the balls 6 aids both the locking and release effects of the balls 6 by also pressing the resilient member 10 downwards when its magnetizable material (iron) is also subjected to the magnetic field. For this, the member 8 must have such a predetermined large thickness as not to saturate magnetically. In other words, the magnetic field should have to be so strong that unauthorized persons cannot open the lock, i.e. defeat the locking effect, with small, e.g. toy magnets. This requires a large spring force for resilient member 10 and, therefore, a corresponding thickness of the member 8 to produce magnetically the force to compress the resilient member 10 for the release effect. As a result, too, the plastic housing has to be fastened to the brass housing 14 with a snap bead in a groove 11a.

Figure 3A:
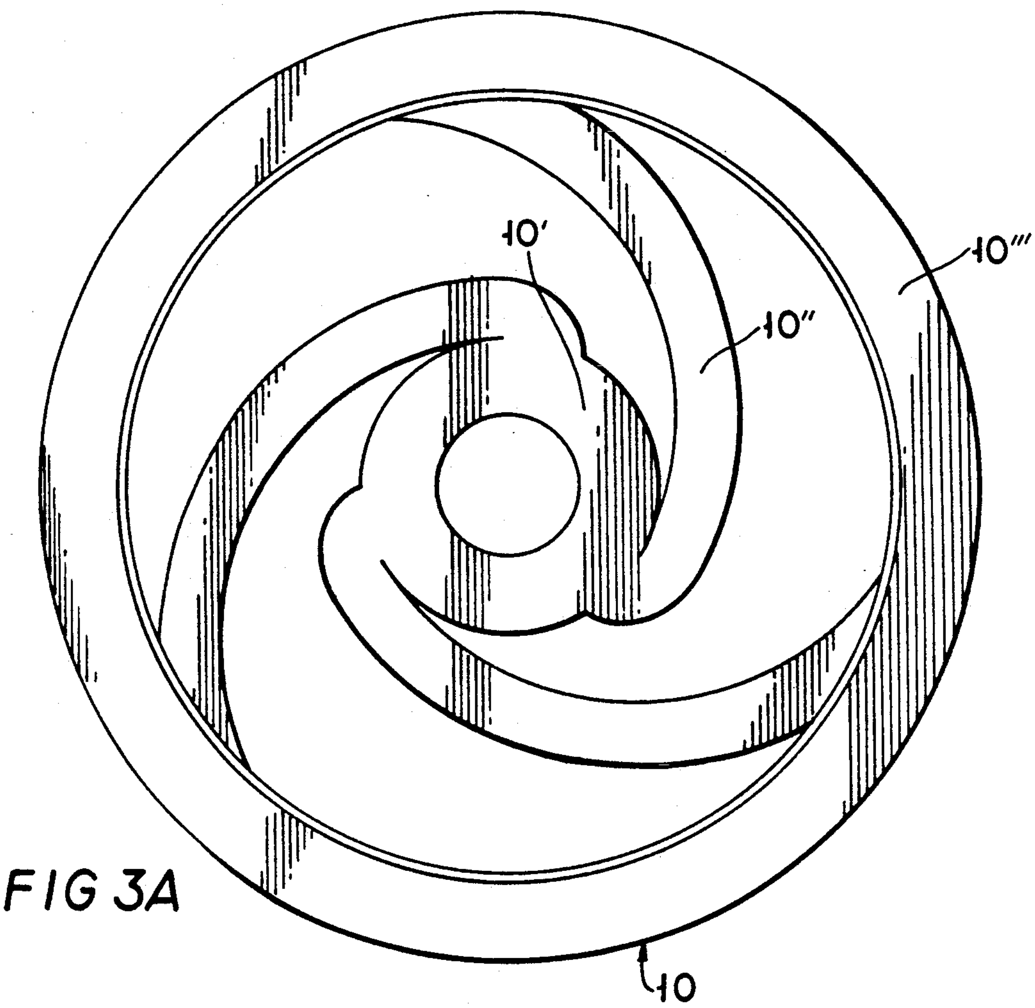
FIG. 3A is a bottom view of a bottom part of the lock of FIGS. 1 and 2.
Figure 3B:
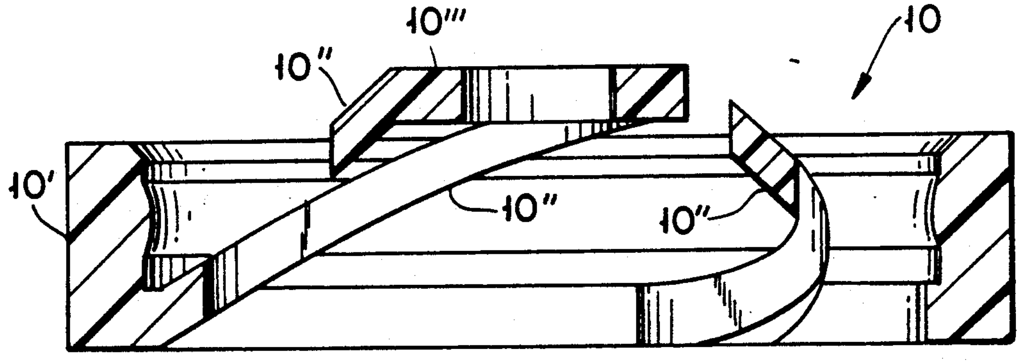
FIG. 3B is an elevation, partly in section, of the bottom part of FIG. 3A.

The resilient body 10 on the bottom of the plastic housing member 16 simultaneously forms the bottom member 10''' of the ball-holding cavity 1e. In the illustrated embodiment, these are one piece. As a result the manufacture and assembling of the lock is considerably facilitated. The three helical arms 10'' (FIGS. 3A and 3B) render it possible to keep the bottom member that engages member 8 always perpendicular to the axis of the cavity 1e. When the resilient member 10 is compressed by the magnetic force on the member 8, the helical arms 10'' turn slightly. At least three helical arms 10'' must be provided, therefore, in order to keep the bottom member 10''' from tilting. The plastic of the resilient member 10 is preferably nylon.

A further object of forming the lock as described above is to render it possible to use a rod-shaped body without retaining grooves. Attempts at pulling out the rod-shaped body and turning it might result in a helical, screwing effect. When four identical balls 6 are present, as in the embodiment of FIGS. 1 to 3 (only three balls 6 being shown) and the cavity 1e is conical, all four balls tend to press on the same cross section of the rod-shaped body 1d irrespective of how much it is retracted, whereby turning the rod-shaped body can only result in forming one groove. Moreover, if only one ball were used, it is difficult to center the rod-shaped body in the lock, and it can, thus, be pulled a short distance. The large spring force of the resilient member 10 described above also presses the balls so hard against the rod-shaped body that, on turning it, the balls remain in position while, instead, the entire lock turns in the first and second members 14. Turning the rod-shaped body 1d and lock (housing members 14, 16 and resilient member 10) relative to the first and second members 1, 4 is made harder, however, in that the cavity 5a of the lower member 4 has been provided with an inward, circumferential bead 17 that presses against the housing member 14 of the lock. When it is attempted to pull the rod-shaped body out of the lock, this also increases the friction between the lock and this bead, which makes it still harder to screw the rod-shaped body out of the lock.

Figure 5:
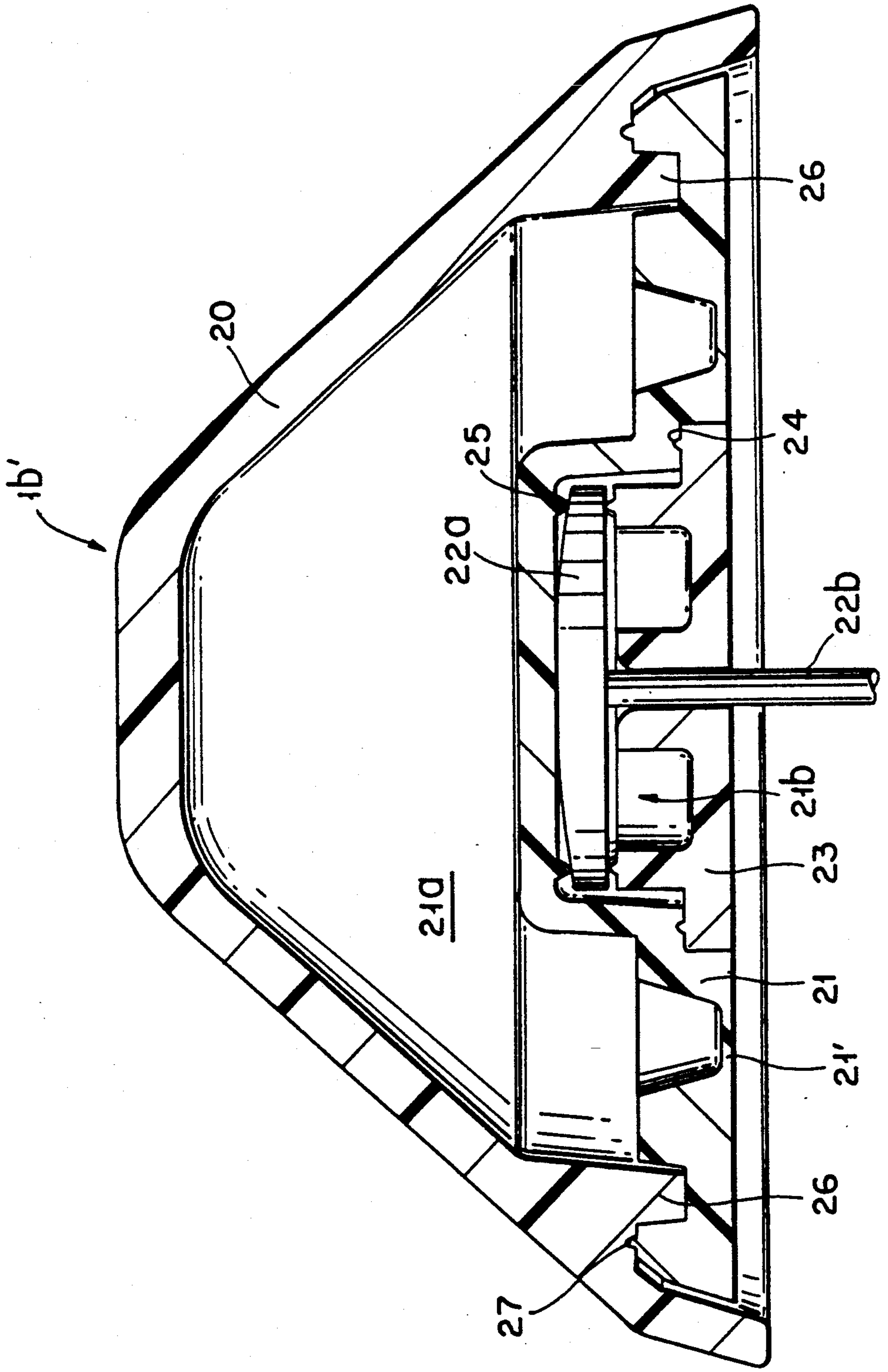
FIG. 5 is a cross-sectional elevation of another particularly advantageous embodiment of a member having a rod-shaped body.

A second, rod-shaped body component 1b of another, color antitheft device has, as shown in FIG. 5, a cup-shaped shell with a closure member 21 across its opening at the bottom in FIG. 5 to form a closed cavity 21a that is filled with fluid (not shown). The closure member provides another cup-shaped cavity 21b that receives the head 22a of a rod-shaped body 22b that projects through a cover 23 that closes the cavity 21b. The head 22a of the rod-shaped body 22b is held between the cavity-forming surface of the closure member 21 and the inner surface of the cover 23 by ultrasonically welding the rims of the latter together at a circumferential welding bead 24. The head 22a of the rod-like body 22b is fixed in its position by circumferential beads 25 on the closure member 21 in its cavity 21b and the cavity cover 24 that press against the head 22a after the ultrasonic welding.

The closure member 21 that closes the fluid-filled cavity 21a of the shell 20 has an annular portion 21' between its cavity 21b and its rim where it engages the shell 20 that is weaker than the rest of the closure member. The weakened portion 21' of the member 21 is of a thickness of approximately 0.3 mm. The rim of the closure member 21 is secured to the rim 26 of the shell 20 by ultrasonic welding. These rims fit together to prevent the fluid, which is preferably liquid, in the cavity 21a from leaking out, even to the welding line 27 where it might reduce the quality of the welding. The rims also provide guides for the automated production equipment. The welding may be, alternatively, gluing. In either case, however, it must be liquid tight so the liquid cannot leak out.

The above-described plastic member may, for instance, be made of polycarbonate. The liquid may, for instance, be a solution of water, dye and glycerine. The only requirements form the liquid are that it is a non-precipitating, homogenous mixture with a low freezing point. The plastic material should furthermore be UV-treated so as to be able to stand sunlight. In addition, the plastic material must be strong enough that no leakage occurs under normal handling condition. It must not, however, be so strong that it does not break in the case of violence, and, in particular, break at the weakened portion 21' if a tool is inserted to try to pry the rod-like body 22b from the other component of the lock without magnetically unlocking the lock as described above.

Figure 6:
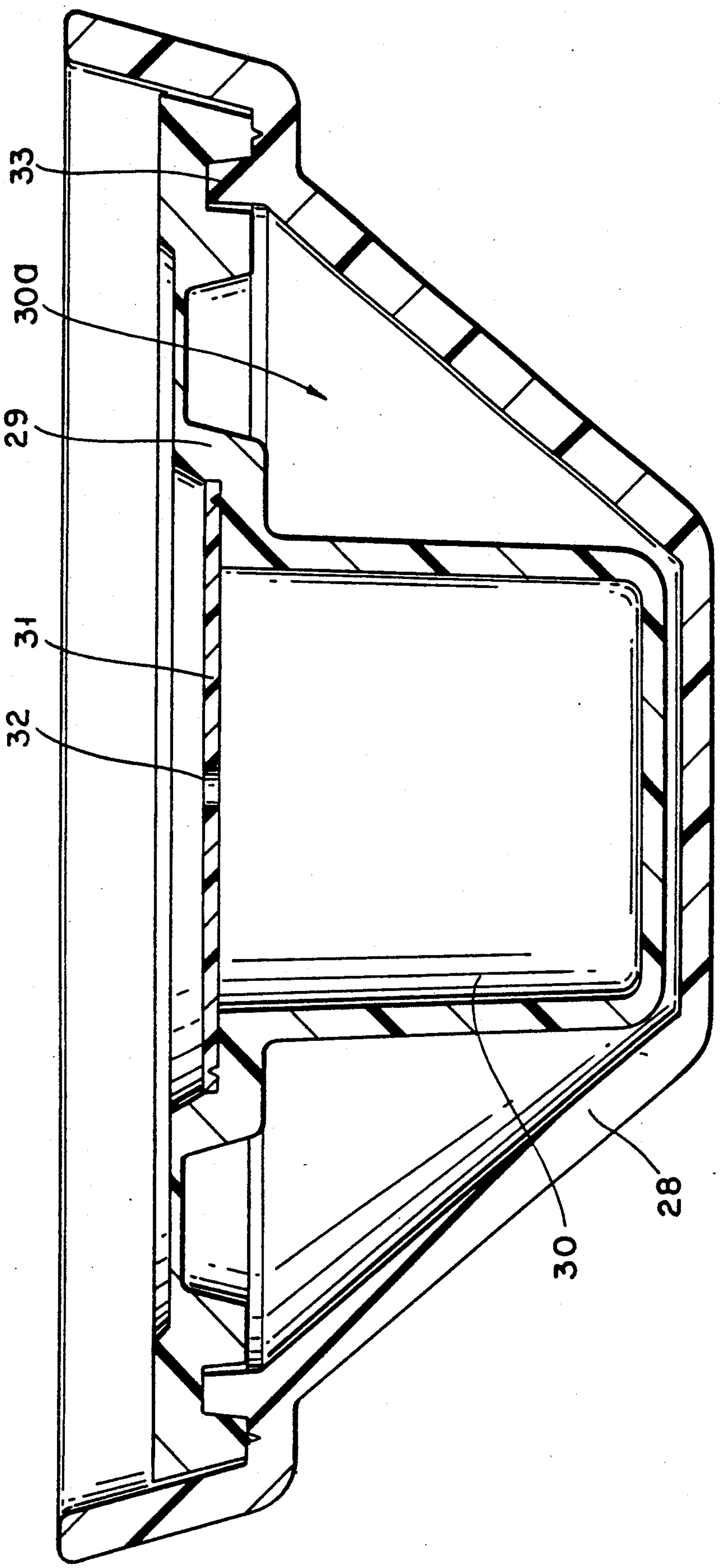
FIG. 6 is a cross-sectional elevation of a mating member for the embodiment of FIG. 5 having a lock.

The other component of the lock (not shown in FIG. 6, 1a in FIGS. 1 and 2) is in a cavity 30 in a member shown in FIG. 6 that mates with the rims and rod-shaped body 22b of the member of FIG. 5. This member comprises a shell 28 and a cover member 29 for defining one cavity 30a, the cover member having another cavity 30 for receiving the lock (not shown) and being closed by a cover 31. During assembly, the lock is initially arranged in the cavity 30, whereafter the cover 31, which has an opening 32 in its middle, is mounted on the cover member 29. In this case there is low friction between the lock and the cover member and cover when an unauthorized person tries to pull and/or turn the rod-shaped body 22b (FIG. 5) from the lock (not shown) in the cavity 30. The cover 31 is ultrasonially welded or glued to the cover member 29. Then the cover member 29 is secured to the rim 33 about the cup of shell 28 by ultrasonic welding. Here, too, the circumferential rim 33 prevents the liquid in the shell cavity 30*a* from leaking out and destroying the ultrasonic welding. The circumferential rim 33 serves simultaneously as an assembly guide.

An active unit (not shown), such as an oscillating circuit or a piece of amorphous material, may be placed in any of the cavities shown in FIGS. 5 and 6, too, said unit being detectable at an exit or cash register in such a manner that the sales clerk does not forget to remove the color antitheft device from the article before the customer leaves the store.

The above members can, of course, also be combined with other antitheft devices.

I claim:

1. An antitheft device for marking an article for sale, the device comprising:

first and second members, interlock means on the members for automatically interlocking a portion of the first member in a first cavity (30) having an axis in the second member, the interlocking means comprising a rod-shaped body (22*b*) with an at least partially pointed insertion end on the first member for engaging balls loosely arranged radially about the first cavity (30) of the second member, a third member of magnetizable material in the first cavity (30) axially of the loosely arranged balls, a resilient member in the first cavity for providing a driving force to the third member toward the balls, the resilient member being an annular plastic member with inward connecting parts connected to a centrally arranged disk-shaped plastic member for pressing against the third member in the first cavity (30), and an additional cavity (30*a*) in the second member around the first cavity (30), wherein the second member comprises a shell (28) having the additional cavity (30*a*) and a closure member (29) on the shell (28) for closing the additional cavity (30*a*) of the shell (28), the closure member (29) providing the first cavity (30) and having a cover (31) for closing the first cavity (30), the closure member (29) having weakened portion means for breaking if a tool is inserted between the first and the second members when interlocked, whereby a liquid in the additional cavity (30*a*) can be released.

2. An antitheft device for marking an article for sale, the device comprising:

first and second members, interlock means on the members for automatically interlocking a portion of the first member in a first cavity (30) of the second member, the interlocking means comprising a rod-shaped body with an at least partially pointed insertion end, on the first member for engaging a lock in the first cavity of the second member, a fluid containing additional cavity in the second member around the first cavity, wherein the second member comprises a shell (28) having an additional cavity (30*a*) and a closure member (29) on the shell (28) for closing the additional cavity (30*a*) of the shell (28), the closure member (29) being provided with the first cavity (30) and a cover (31) therefor with an opening in the middle for receiving the rod-shaped body.

* * * * *